(12) United States Patent
Lee et al.

(10) Patent No.: US 7,748,026 B1
(45) Date of Patent: Jun. 29, 2010

(54) TRANSPARENT INTERCEPTORS FOR PRIVACY POLICY IMPLEMENTATION

(75) Inventors: Wing K. Lee, Overland Park, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1100 days.

(21) Appl. No.: 11/093,607

(22) Filed: Mar. 30, 2005

(51) Int. Cl.
*H04L 29/00* (2006.01)

(52) U.S. Cl. .................. 726/1; 726/4; 726/17; 726/28; 726/29; 726/30

(58) Field of Classification Search ................. 726/4, 726/17, 28, 29, 30, 1
See application file for complete search history.

(56) References Cited

U.S. PATENT DOCUMENTS

| | | | |
|---|---|---|---|
| 6,314,463 B1 * | 11/2001 | Abbott et al. ............... 709/224 |
| 6,633,923 B1 | 10/2003 | Kukura et al. |
| 6,782,431 B1 * | 8/2004 | Mukherjee et al. .......... 709/246 |
| 6,839,708 B1 | 1/2005 | Boydstun et al. |
| 7,064,652 B2 * | 6/2006 | Junqua et al. ............. 340/5.84 |
| 7,171,684 B1 * | 1/2007 | Marquet et al. ............... 726/14 |
| 7,299,493 B1 * | 11/2007 | Burch et al. .................. 726/5 |
| 7,558,756 B1 * | 7/2009 | Wesly et al. ................. 705/38 |
| 2002/0173296 A1 * | 11/2002 | Nordman et al. ............ 455/414 |
| 2002/0188869 A1 * | 12/2002 | Patrick ........................ 713/201 |
| 2003/0200459 A1 * | 10/2003 | Seeman ....................... 713/200 |
| 2004/0019809 A1 * | 1/2004 | Sheinis et al. ............... 713/202 |
| 2004/0054696 A1 * | 3/2004 | Sheinis et al. ............... 707/201 |
| 2004/0143628 A1 * | 7/2004 | Bradford et al. ............. 709/203 |
| 2004/0255006 A1 * | 12/2004 | Collet et al. ................. 709/218 |
| 2005/0114677 A1 * | 5/2005 | Kanai .......................... 713/182 |
| 2006/0143464 A1 * | 6/2006 | Ananthanarayanan et al. .......................... 713/182 |

OTHER PUBLICATIONS

C. Marchetti, L. Verde and R. Baldoni; "CORBA Request Portable Interceptors: A Performance Analysis"; 2001 IEEE; pp. 208-217.*
Boydstun, et al., Computer System Having an Authentication and/or Authorization Routing Service and a Corba-Complaint Interceptor for Monitoring the Same, filed Dec. 10, 2004, U.S. Appl. No. 11/009,469, 37 pgs., drawings (3 sheets).
Boydstun, Security Framework Data Scheme, filed Oct. 31, 2003, U.S. Appl. No. 10/284,809, 43 pgs., drawings (3 sheets).
Boydstun, Security Framework Bridge, filed Oct. 31, 2003, U.S. Appl. No. 10/284,680, 45 pgs., drawings (3 sheets).
Boydstun, et al., Integrated Security Framework and Privacy Database Scheme, filed Dec. 17, 2003, U.S. Appl. No. 10/738,244, 53 pgs., drawings (3 sheets).

(Continued)

*Primary Examiner*—Carl Colin (57) ABSTRACT

A system and method for applying a privacy policy to an application is provided. The system comprises a data store adapted to defining at least one privacy policy. The system also comprises an interceptor logic component operable to authorize access to information based on the at least one privacy policy. The system further comprises a middleware mechanism operable to receive a request for a service provided by the application, wherein the request relates to private data, to request the interceptor logic component to authorize the request, and to reject the request for the service for an unauthorized request.

18 Claims, 5 Drawing Sheets

OTHER PUBLICATIONS

Crews, et al., Integrated Privacy Rules Engine and Application, filed Dec. 17, 2003, U.S. Appl. No. 10/738,763, 44 pgs., drawings (4 sheets).

Fultz, et al., Rules Engine Architecture and Implementation, filed Dec. 17, 2003, U.S. Appl. No. 10/738,598, 43 pgs., drawings (4 sheets).

Christopher M. King; "Web Access Security"; 2000; TISC Insight, vol. 2, Issue 23, 12 pgs.

Kermitsis, et al.; "HP Distributed Smalltalk: a tool for developing distributed applications"; Apr. 1995; Hewlett-Packard Journal, v46, n2, p. 85(8); ISSN: 0018-1153, 7 pgs.

* cited by examiner

TRANSPARENT INTERCEPTORS FOR PRIVACY POLICY IMPLEMENTATION

CROSS-REFERENCE TO RELATED APPLICATIONS

This application has subject-matter related to U.S. patent application Ser. No. 10/738,763, entitled Integrated Privacy Rules Engine and Application, inventors John C. Crews, David Fultz, and Srinivas Pogiri, filed on Dec. 17, 2003, U.S. patent application Ser. No. 10/738,598, entitled Rules Engine Architecture and Implementation, inventors David Fultz, Kemi Y. Ibitayo, and Anu Ramanujam, filed on Dec. 17, 2003, U.S. Pat. No. 6,839,708 entitled "Computer System Having An Authentication and/or Authorization Routing Service and a CORBA-Compliant Interceptor for Monitoring the Same," filed Feb. 26, 2002, by Ken Boydstun, et al, and to U.S. Continuing application Ser. No. 11/009,469, entitled "Computer System Having an Authentication and/or Authorizing Routing Service and a CORBA-Compliant Interceptor for Monitoring the Same," filed Dec. 10, 2004, by Ken Boydstun et al, which are all hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to the management of data in computer-based systems, and more particularly, but not by way of limitation, to a system and method for the use of transparent interceptors for privacy policy implementation.

BACKGROUND OF THE INVENTION

The emergence of the Internet has ignited an evolution of distributed information technology systems. Information technology systems include information services that enable users with a myriad of functions, such as the ability to purchase services and/or goods at anytime and at any place in the world.

Although information services have provided nearly instant access to information, numerous security risks exist. For example, some transactions may include sensitive or private information such as social security numbers, credit card numbers, and/or other information. Private information can be exposed or lost between one or more wired/wireless entities within an information service infrastructure (i.e., a network enterprise including one or more data stores, one or more software applications, and computing devices interconnected through wired and/or wireless means).

Private information is readily exposed within the service infrastructure as a result of inadequate filtration of information from a data store within the service infrastructure. One method utilized for providing security includes various modifications to applications. The modifications can include rules used for filtering private information. However, applying security modifications to each application requires a considerable amount of resources for coding and development.

SUMMARY OF THE INVENTION

An embodiment of the present disclosure is a system for applying a privacy policy to an application. The system comprises a data store to define a privacy policy and an interceptor logic component to authorize access to information based on the privacy policy. The system also comprises a middleware mechanism to receive a request for a service provided by the application, the request relating to private data, to request the interceptor logic component to authorize the request, and to reject the request for the service for an unauthorized request.

In one embodiment, a method for controlling access to private data is provided. The method comprises a broker receiving a plurality of requests for service. The method also comprises a broker authorization component determining whether the request involves access to private data and determining whether a privacy policy permits access to the private data.

In one embodiment a computer-readable medium containing computer executable code related to controlling access to private data is provided. The computer executable code comprises an interceptor logic component to authorize access to information based on a privacy policy. The computer executable code also comprises a middleware mechanism to receive a request for a service provided by an application, wherein the request for service relates to private data, to request the interceptor logic component to authorize the request, and to reject the request for the service for an unauthorized request.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

As used herein, the term data store may refer to various computer-based storage systems, protocols, lightweight directory access protocol (LDAP), and/or applications such as relational databases, directories, and other storage systems. The term application may refer to various computer-based systems and protocols, such as operating systems, spreadsheets, databases, functional programs, a software routine, and/or a collection of functions, at least one request for service, and/or other computer-based entities. It is to be further understood that the term application is not limited to the entities discussed, but may include other computer-based entities.

Computer transactions that include private information may result in undesirable exposure or revealing of the data to unauthorized persons. One method utilized for providing privacy includes providing various modifications to client software. However, applying security modifications is undesirable because it is time consuming and consumes a significant amount of resources.

The embodiments discussed below contemplate a system and method for implementing a privacy policy that entails little or no modification of clients and/or applications, and which is substantially transparent to the client. The system and method include an intercepting logic entity adapted for inter-working with existing middleware mechanisms to apply a privacy policy to client requests to applications and vice versa. The interceptor may then check with privacy system to determine whether to permit transactions based on the underlying data involved. The intercepting logic entity registers with a middleware mechanism that receives messages for a distributed application. In one embodiment, the intercepting logic entity registers with one or more interceptors (e.g., non-application components) located within the middleware mechanism. The intercepting logic entity provides authorization for access to private information associated with the application and/or client.

Figure 1A:
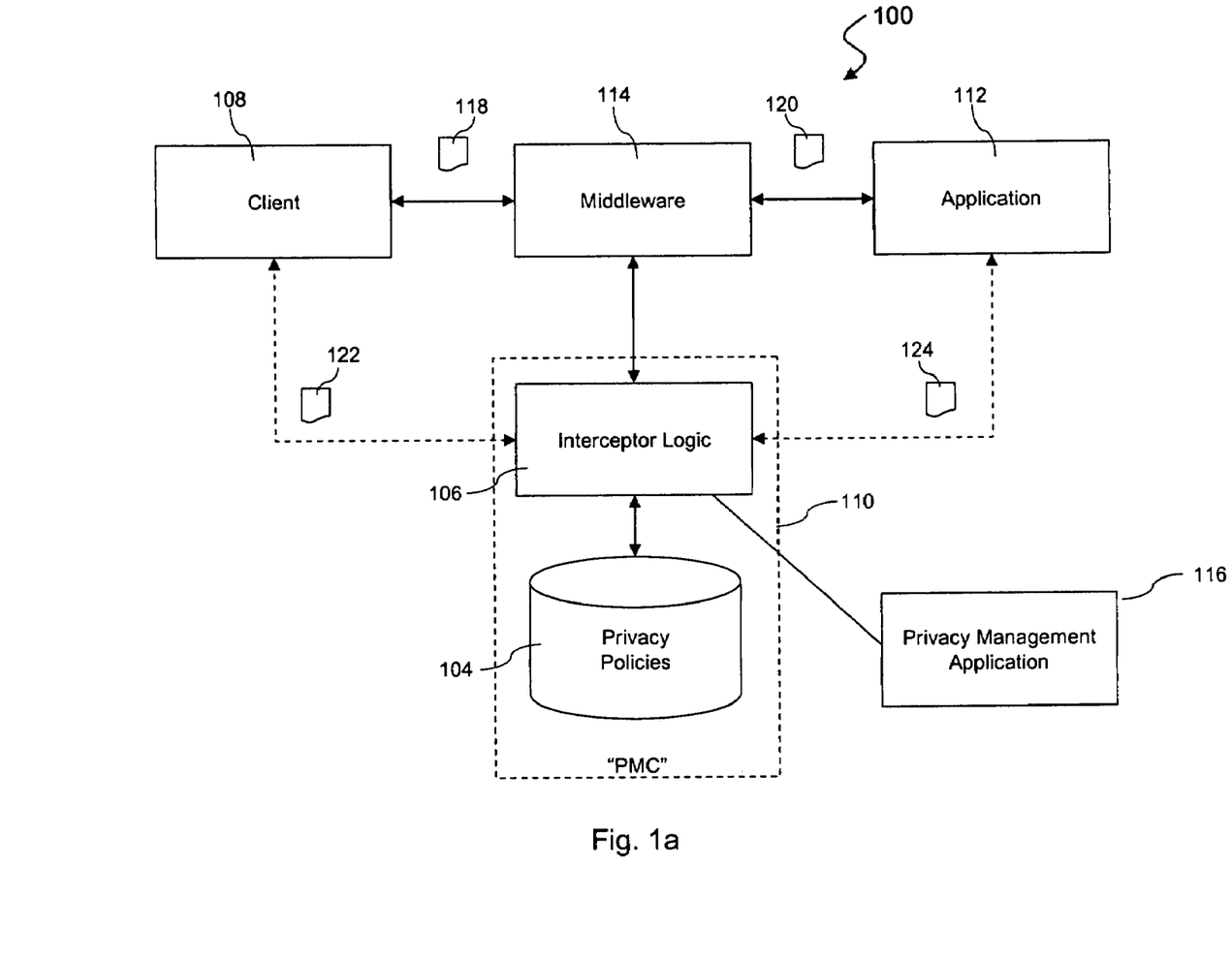
FIG. 1a is a block diagram of an embodiment of the present disclosure.

Turning now to FIG. 1a, a block diagram of a system 100 for applying a privacy policy is depicted. The system 100 includes a client 108, a privacy management component (PMC) 110, an application 112, and a middleware mechanism 114. The privacy management component 110 is coupled to the middleware mechanism 114. The middleware mechanism 114 connects the client 108 and the application 112. The client 108 and the application 112 may communicate through messages 118, 120. In one embodiment, the term message refers to one or more requests for service and/or replies. The messages 118, 120 are typically supported by one or more protocols.

The client 108 may be a computer program. The client 108 may operate on one or more computer-based entities, such as a general purpose computer system, personal digital assistants (PDAs), mobile phones, mainframe computers, workstations, servers, laptop computers, desktop computers, hand-held or portable devices hand-held devices, and/or other computer-based entities. Alternatively, the client 108 may be enabled as a software program, an application, or a function, for example. Such program or function may invoke the message 118 directed to the application 112. The application 112 is typically a computer program operable to execute on a general-purpose computer system. General purpose computer systems are discussed in greater detail hereinafter.

The middleware mechanism 114, also referred to as a broker or mediator, may include one or more service technologies such as common object request broker architecture (CORBA), JAVA remote method invocation (RMI), MQSeries, web services, and/or other middleware technologies. The messages 118, 120 may be performed with one or more of a variety of protocols, such as Internet inter-ORB protocol (IIOP), JAVA remote method protocol (JRMP), message service queue, and/or other messaging protocols. In one embodiment, the middleware mechanism 114 includes an object request broker (ORB), which may provide routing of the messages 118, 120 to and from the application 112. The middleware mechanism 114 may also include one or more interceptors, which may be registered by an interceptor logic component 106 of the privacy management component 110.

In one embodiment, the privacy management component 110 (also referred to as an authorization component) includes the interceptor logic component 106 and one or more privacy policies 104. The privacy management component 110 registers with the middleware mechanism 114 to be called in the event of message 118, 120 activity. In one embodiment, registration includes the acknowledgement of the interceptor logic component 106 by the middleware mechanism 114. Thus, when messages 118, 120 are created, the middleware mechanism 114 alerts or calls the interceptor logic component 106, the interceptor logic component 106 determines the content of the messages 118, 120 and operates with the privacy policies 104 to authorize or deny access to private information associated with the application 112 and/or the client 108. Authorization of the messages 118, 120 may be specific to the application 112, that is the privacy policies 104 may include one or more rules and/or configuration files associated with each of the applications 112.

The interceptor logic component 106 registers with the middleware mechanism 114 and authorizes or denies privacy access associated with the application 112 and/or the client 108. In an embodiment, the interceptor logic component 106 registers with one or more interceptors within the middleware mechanism 114. In one embodiment, the middleware mechanism 114 invokes the interceptor logic 106 for any data type message 118, 120. Alternatively, the middleware mechanism 114 invokes interceptor logic component 106 for specific data type messages 118, 120, which may be identified by the privacy policies 104. The interceptor logic component 106 may be connected directly to the privacy policies 104 or may be connected to a privacy management application 116, which is operable to determine whether to authorize access to the data. The privacy management application 116 is described in greater detail hereinafter. In one embodiment, the interceptor logic component 106 applies rules associated with the privacy policies 104 to the messages 118, 120. For example, the rules may configure or instruct the interceptor logic component 106 to authorize or deny access to private data based on an identification of a requesting party, an identification of an owner of the private data, and/or an intended use of the private data that may be included in the messages 118, 120.

The interceptor logic component 106 further includes one or more adapters, which enable compatibility of a non-conforming portion of the privacy policies 104 with the middleware mechanism 114. For example, the middleware mechanism 114 may include common object request broker architecture, while selected portions of the interceptor logic component 106 and/or the privacy policies 104 may be adapted for MQSeries. The adapter would provide compatibility of the middleware mechanism 114 with the interceptor logic component 106.

For purposes of illustration, in one embodiment, the interceptor logic component 106 responds to the middleware mechanism 114, identifies information which may be private, and which may be deemed as private according to the privacy policies 104. For example, the message 118 may include one or more instructions for a request of social security numbers associated with a list of names from the client 108. The interceptor logic component 106 may reject or allow the at least a portion of the in-bound message 118. Alternatively, the message 120 may include private data and thus, interceptor logic component 106 may reject or allow at least a portion of the out-bound message 120.

In another embodiment, the interceptor logic component 106 may send a message 122, 124 or "query" directed to the client 108 and/or the application 112. For example, the interceptor logic component 106 may interact with the message 118, 120, which may include an internet protocol (IP) address associated with the client 108, a list of names, and a request for the social security numbers associated with the list of names. The interceptor logic component 106 then may allow, mask or deny service associated with specific names within the list. Following a first invocation of the interceptor logic component 106, the message 118 is received by the application 112, whereby the message 120 is created.

Following the processing of the message 118, 120, the message 122, 124 may be transmitted to the client 108 and/or the application 112. The message 122, 124 may include requests for identity, such as IP address, name, and/or other requests. Of course, it is understood that the messages 122, 124 may also include an Internet inter-ORB protocol (110P), and/or other messaging protocols.

The privacy policies 104 may include one or more data stores, which may include relational databases and/or may include directories compliant with a protocol such as the lightweight directory access protocol (LDAP) or its successors. The privacy policies 104 may include a plurality of configuration files (not shown) or rules, which indicate whether or not the client 108 is authorized to access the information requested by the message 118. In one embodiment, the privacy policies 104 include one or more instructions adapted for applying privacy rules to the application 112, the client 108, and/or the messages 118, 120, 122, and 124. The privacy policies 104 may be expressed in a variety of different languages and may be adapted to various service infrastructure environments. For example, the privacy policies 104 may be expressed in extensible markup language (XML). The privacy policies 104 may direct the interceptor logic component 106 to authorize access to private data based on the identity of the originator of the message 118, 120 and/or the identity of the owner of any requested information. In one embodiment, the privacy policies 104 also operate based on data type and may further determine the purpose of use of the information. The privacy policies 104 may be modified or updated by external entities such as text editors, web browsers, and/or other user interface applications. In other embodiments, the privacy policies 104 may include a customer data privacy management (CDPM) system (i.e., any application and/or system adapted for providing security services).

Figure 1B:
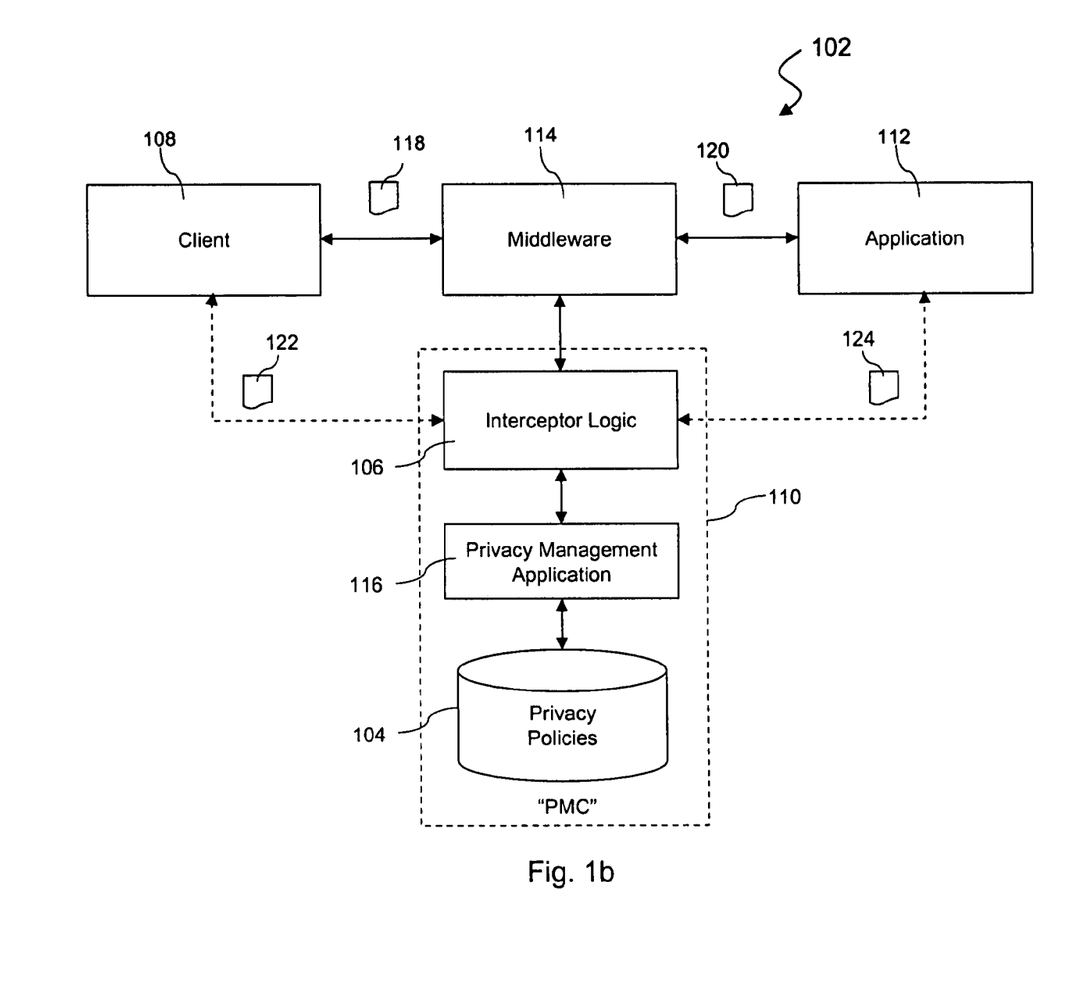
FIG. 1b is a block diagram of another embodiment of the present disclosure.

Turning now to FIG. 1*b*, a block diagram of a system 102 for applying a privacy policy is depicted. The privacy management component 110 includes the privacy management application 116 disposed between the privacy policies 104 and the interceptor logic component 106. The privacy management application 116 determines how to apply the privacy policies 104 to the messages 118, 120, based upon input from an external entity, such as the interceptor logic component 106, the application 112, the client 108, a user, and/or other computer-based entity. In one embodiment, the interceptor logic component 106 registers with the middleware mechanism 114 and may operate to alert the privacy management application 116 that message 118, 120 include privacy data. Hence, the privacy management application 116 may receive an authorization request from the interceptor logic component 106 and determines authorization of access to information based on one or more privacy policies 104.

In another embodiment, the privacy management application 116 may further include one or more instructions to base authorization of the request to access privacy information on the identity of the originator of the message 118, 120, and the owner of any associated information being requested by the message 118, 120. The privacy management application 116 may also include one or more instructions to base authorization of the request to access private information on a type of the application 112 and/or the type of the message 118, 120, for example based on an intended use of the private information that may be inferred from the type of the application 112 and/or the type of the message 118, 120. The privacy management application 116 may further include one or more instructions adapted for determining authorization of information originating from the application 112 and/or client 108. In one embodiment, the privacy management application 116 also operates based on data type and may further determine the purpose of use of the information. In other embodiments, the privacy management application 116 may include a customer data privacy management (CDPM) system, such as that disclosed in U.S. patent application Ser. No. 10/738,763, entitled Integrated Privacy Rules Engine and Application, inventors John C. Crews, David Fultz, and Srinivas Pogiri, filed on Dec. 17, 2003, and in U.S. patent application Ser. No. 10/738,598, entitled Rules Engine Architecture and Implementation, inventors David Fultz, Kemi Y. Ibitayo, and Anu Ramanujam, filed on Dec. 17, 2003, both of which are incorporated herein by reference for all purposes.

Figure 2:
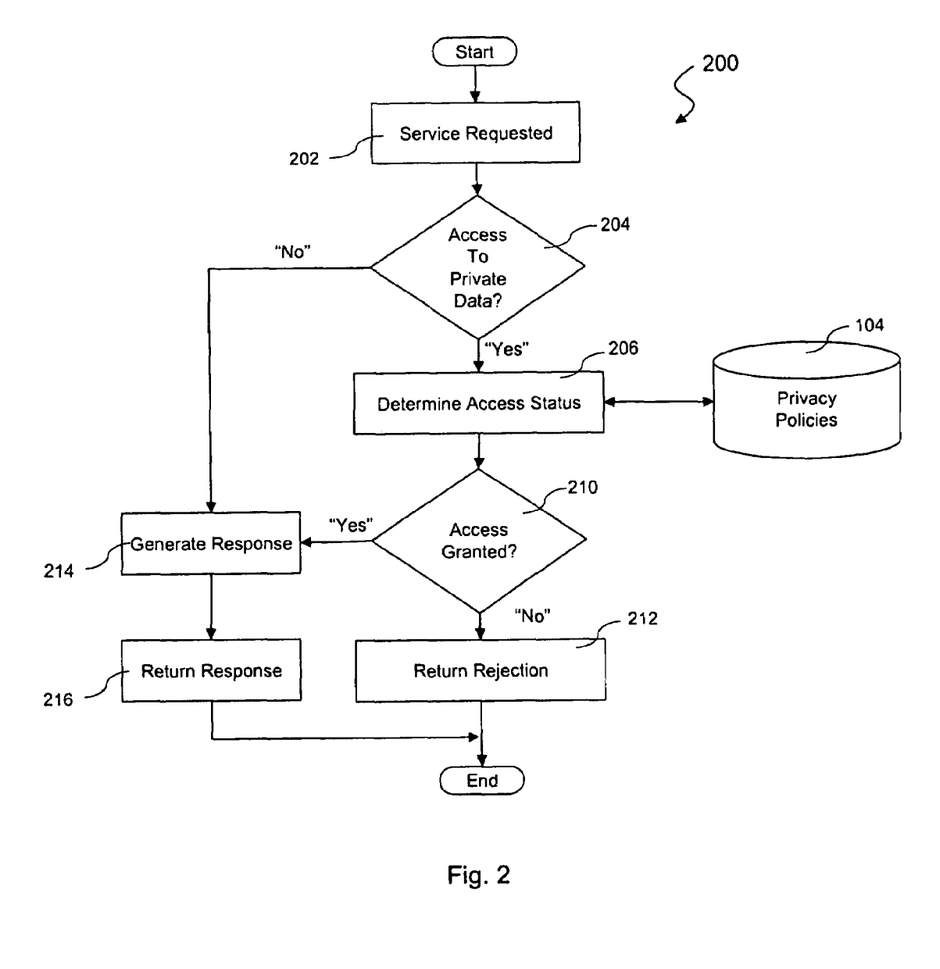
FIG. 2 is a logic diagram of one embodiment of a method for implementing a privacy policy constructed according to aspects of the present disclosure.

Turning now to FIG. 2, a flow diagram depicts a process 200 for applying a privacy policy. In block 202, the client 108 requests a service from the application 112 via the middleware mechanism 114. The request may include information identifying the service requested, the application 112 to which the service request is directed, the client 108, the data type and/or data types of requested information, and other information. In an embodiment, the client 108 may generate a request message, and the request message may be transported from the client 108 to the application 112 via the middleware mechanism 114. The process flows to block 204 where if the service requested involves access to private data, the process flows to block 206.

In block 206, the access status or authorization is determined by consulting the privacy policies 104, that is the privacy policies 104 may identify the data types and/or classifications which may be accessed by a request for service. The access status may grant access or deny access to the private data. The determination of the access status may involve consideration of the identity of the client 108, security roles or groups that the requestor has been assigned, the purpose of the client 108 in requesting the private data, and the specific private data the client is requesting. In an embodiment, the privacy policies 104 are consulted during every determination of access status. This approach may promote ease of privacy policy revision and updating. In another embodiment, the privacy policies 104 may be consulted only on initialization of the system 100, 102 and the information pertaining to the privacy policies 104 stored in a portion of a program memory space, such as in the program memory space of the interceptor logic component 106 and/or the privacy management application 116.

The process flows to block 210. In block 210, if the access status is granted, or in block 204 if the service requested in block 202 is not for private data, the process flows to block 214 where a response to the request for service is generated by the application 112. The process flows to block 216 where the response is returned. In an embodiment, a response message is built by the application 112, and the response message is transported from the application 112 to the client 108 via the middleware mechanism 114. The process then exits.

In block 210, if the access status is denied, the process proceeds to block 212 where the request of the client 108 is rejected. In an embodiment, a rejection message may be built by the application 112, and the rejection message may be transported from the application 112 to the client 108 by the middleware mechanism 114. Alternatively, a rejection message may be created by the privacy management application 116, and the rejection message may be transported from the privacy management application 116 to the client 108 through the middleware mechanism 114. The process then exits.

Figure 3:
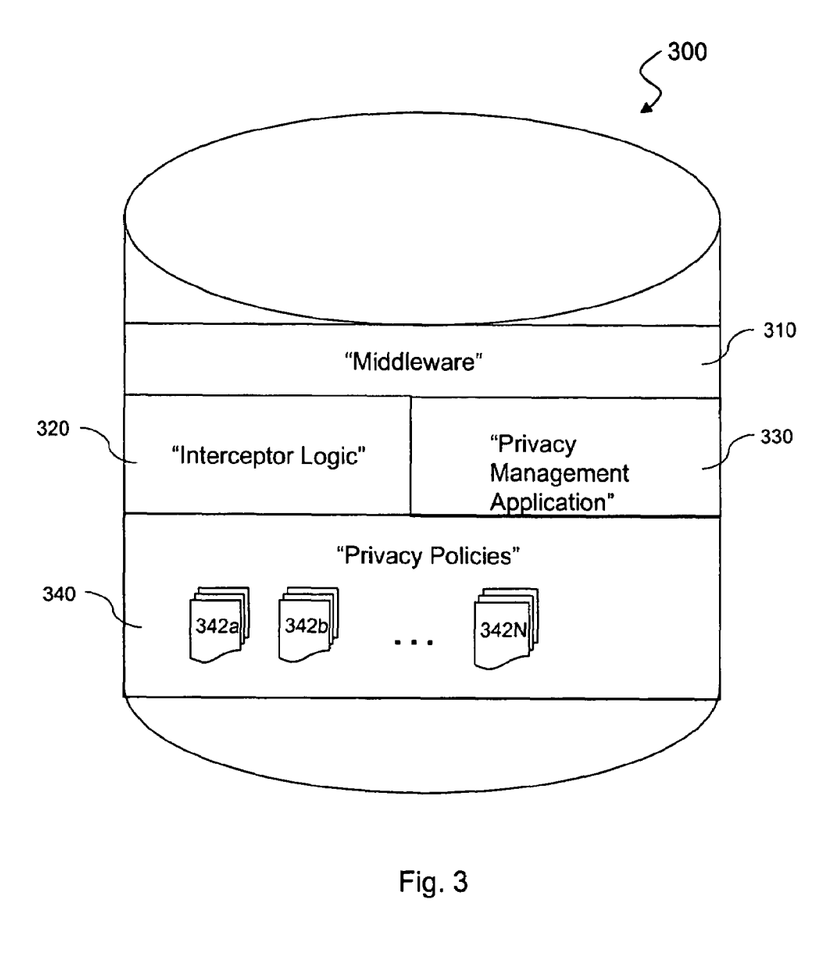
FIG. 3 is a diagram of a computer-implemented medium according to one embodiment of the present disclosure.

Referring now to FIG. 3, a block diagram depicts a computer-readable medium 300 constructed according to aspects of the present disclosure. The medium 300 includes one or more executable computer programs. The medium 300 includes a middleware mechanism 310, an interceptor logic component 320, an optional privacy management application 330, and one or more privacy policies 340. In one embodiment, the middleware mechanism 310, the interceptor logic component 320, the privacy management application 330, and the privacy policies 340 may be substantially similar to the middleware mechanism 114, the interceptor logic component 106, the privacy management application 116, and the privacy policies 104 of the systems 100 and 102 of FIGS. 1a and 1b. It is also understood, that the middleware mechanism 310 may be referred to as a broker or mediator and that the interceptor logic component 320, the privacy management application 330, and the privacy policies 340 may be referred to as an authorization component.

The instructions associated with the interceptor logic component 320 may be stored on the computer-readable medium 300. The interceptor logic component 320 may operate according to one or more software routines, which may invoke responses from the privacy management application 330 and/or the privacy policies 340. The privacy management application 330 may communicate directly to the privacy policies 340 to extract privacy rules from one or more configuration files 342a, 342b, . . . 342N. Alternatively, the interceptor logic component 320 may by-pass the privacy management application 330 to extract privacy rules from the configuration files 342a, 342b, . . . 342N.

The privacy policies 340 includes one or more data stores, and may include one or more of the configuration files 342a, 342b, . . . 342N. The configuration files 342a, 342b, . . . 342N include a variety of privacy rules, which may include categories such as a social security number, a mobile number, name, address, a personal identifiable profile, information (data) type, an account number, and/or other information. The categories may further contain information associated with one or more categories. For example, a personal identifiable profile category may include a web-based cookie, a type of email, a log file, and/or other computer-based user profile information. The configuration files 342a, 342b, . . . 342N also include rules that may be application specific and/or client specific, that is one or more configuration files 342a, 342b, . . . 342N may be associated with a web browser, a spreadsheet, a word processor, a text message program, and/or other applications.

Figure 4:
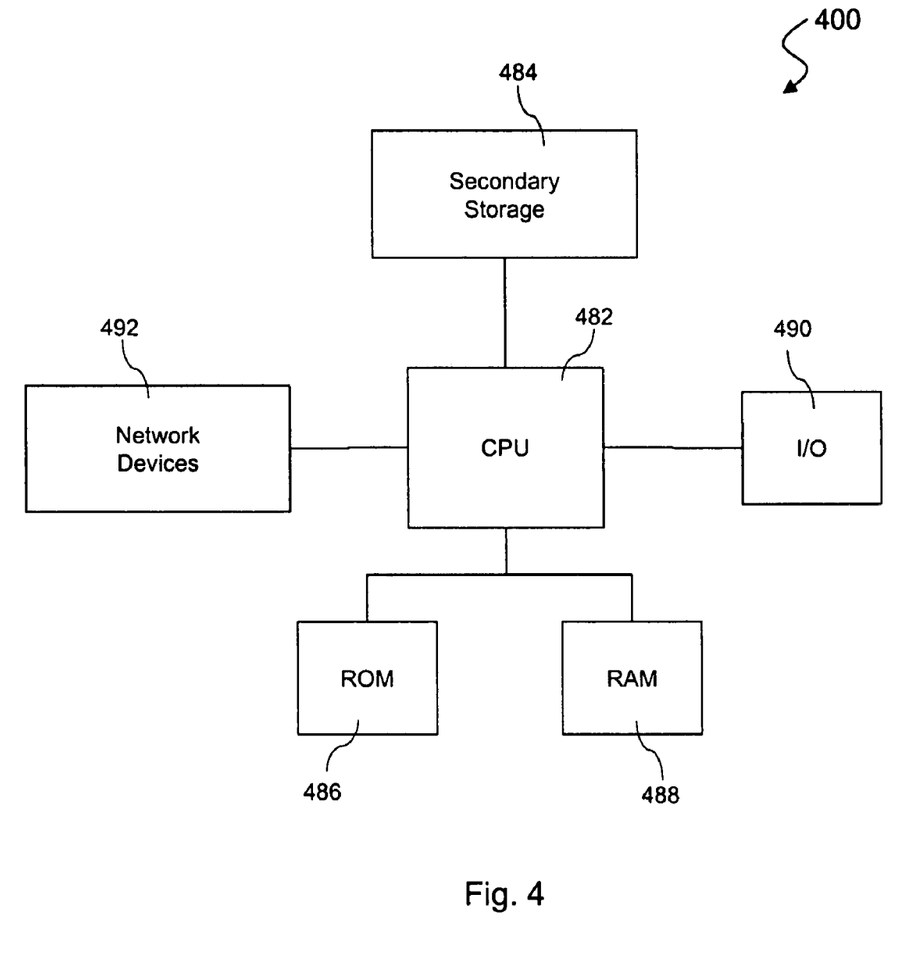
FIG. 4 is a block diagram of a computer system suitable for implementing the several embodiments of the disclosure.

The systems and methods described above may be implemented on any general-purpose computer with sufficient processing power, memory resources, and network throughput capability to handle the necessary workload placed upon it. FIG. 4 illustrates a typical, general-purpose computer system 400 suitable for implementing one or more embodiments disclosed herein. The computer system 400 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs, which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for applying a privacy policy to an application, comprising:
   a data store on a computer readable storage media adapted to maintain a plurality of privacy policies;
   an existing middleware mechanism stored as a set of computer readable instructions in a computer readable storage media and executable by a processor to facilitate an exchange of messages between at least one client and a plurality of applications, the existing middleware mechanism comprising a plurality of message interceptors and the middleware mechanism executable to receive a request from the at least one client to access private information associated with one of the plurality of applications; and
   an interceptor logic component stored as a set of computer readable instructions in a computer readable storage media and executable by a processor to register with at least one message interceptor of the plurality of message interceptors in the existing middleware mechanism, and the interceptor logic component executable to authorize access to the private information associated with the one of the plurality of applications when a result of applying at least one of the plurality of privacy policies associated with the one of the plurality of applications to contents of the request received by the middleware mechanism indicates that access to the private information is authorized.

2. The system of claim 1, wherein the middleware mechanism is selected from the group consisting of a common object request broker architecture middleware mechanism, a java remote method invocation middleware mechanism, a web services middleware mechanism, and a message service queue middleware mechanism.

3. The system of claim 1, wherein the privacy policy is defined in an extensible markup language file.

4. The system of claim 1, wherein the data store is further configured to receive an authorization request from the interceptor logic component and determines authorization of access to the private information based on the at least one of the plurality privacy policies that is associated with the one of the plurality of applications.

5. The system of claim 1, further comprising a privacy management application configured to receive an authorization request from the interceptor logic component and to determine authorization of access to the private information based on the at least one of the plurality privacy policies that is associated with the one of the plurality of applications.

6. The system of claim 5, wherein the privacy management application determines authorization of access to the private information based on an originator of the request.

7. The system of claim 5, wherein the privacy management application determines authorization of access to the private information based on a purpose of the request associated with the one of the plurality of applications.

8. The system of claim 5, wherein the privacy management application is a customer data privacy management system.

9. The system of claim 1, wherein the interceptor logic component authorizes access to the private information based in part on the identity of the one of the plurality of applications.

10. The system of claim 1, wherein the interceptor logic component authorizes access to the private information based in part on a purpose of the request associated with the one of the plurality of applications.

11. The system of claim 1, wherein the middleware mechanism is further configured to forward the request for access to private information to the one of the plurality of applications after the interceptor logic component authorizes the request.

12. The system of claim 1, wherein the middleware mechanism is a common object request broker architecture.

13. The system of claim 1, wherein the interceptor logic component forwards a request for access to private information to the one of the plurality of applications.

14. The system of claim 1, wherein the privacy policy further comprises a customer data privacy management system.

15. A system for controlling access to private data, comprising:
   a broker stored as a set of computer readable instructions in a computer readable storage media executable by a processor to receive a request for service from a requestor, the request for service associated with an application; and
   an authorization component stored as a set of computer readable instructions in a computer readable storage media executable by a processor to determine whether the request for service received by the broker involves access to private data associated with the application;
   the authorization component executable to query the requestor for additional information about the requestor;
   the authorization component executable to determine whether a privacy policy of the application associated with the private data permits access to the private data; and
   the broker executable to provide the request for services based on the determination of the authorization component.

16. The system of claim 15, wherein the authorization component further comprises an interceptor logic component adapted for authorizing the request for service.

17. The system of claim 15, wherein the authorization component further comprises at least one data store adapted for storing the privacy policy.

18. A computer readable storage medium having stored thereon computer executable code comprising:
   an existing middleware mechanism stored as a set of computer readable instructions in the computer readable storage medium and executable by a processor to facilitate an exchange of messages between a client and a plurality of applications, the existing middleware mechanism comprising a plurality of message interceptors, and the existing middleware mechanism receives a request from the client to access private information associated with one of the plurality of applications; and an interceptor logic component stored as a set of computer readable instructions in the computer readable storage medium and executable by a processor to register with at least one message interceptor of the plurality of message interceptors in the existing middleware mechanism, and the interceptor logic component authorizes access to the private information associated with the one of the plurality of applications when a result of applying at least one of the plurality of privacy policy policies associated with the one of the plurality of applications to contents of the request received by the existing middleware mechanism indicates that access to the private information is authorized.

* * * * *